United States Patent
Wong et al.

(10) Patent No.: US 7,966,255 B2
(45) Date of Patent: Jun. 21, 2011

(54) METHOD AND APPARATUS FOR A NO PRE-SET SPENDING LIMIT TRANSACTION CARD

(75) Inventors: Karen L. Wong, New York, NY (US); Fred Jubitz, Ridgewood, NJ (US); Luigi E. Merli, Tuckahoe, NY (US); Caroline M. Azimi-Pour, Hoboken, NJ (US); Jean-Paul D. Ndong, Woohawken, NJ (US); Leena H. Parikh, Hantidale, NY (US); Joya A. Mukherjee, New York, NY (US); Keye G. Jin, Montclair, NJ (US); Priyo B. Chatterjee, Staten Island, NY (US); Subhash C. Khatri, East Windsor, NJ (US); Luckner B. Polycarpe, Brooklyn, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 1343 days.

(21) Appl. No.: 10/286,521

(22) Filed: Nov. 1, 2002

(65) Prior Publication Data

US 2004/0088257 A1 May 6, 2004

(51) Int. Cl.
*G06Q 40/00* (2006.01)
(52) U.S. Cl. .......................... 705/44; 705/41
(58) Field of Classification Search .................. 705/44, 705/41
See application file for complete search history.

(56) References Cited

U.S. PATENT DOCUMENTS

| | | | |
|---|---|---|---|
| 4,594,663 A | 6/1986 | Nagata et al. | |
| 4,874,932 A | 10/1989 | Kimizu | |
| 4,891,503 A * | 1/1990 | Jewell ........................... | 235/380 |
| 5,025,138 A | 6/1991 | Cuervo | |
| 5,177,342 A | 1/1993 | Adams | |
| 5,352,876 A | 10/1994 | Watanabe et al. | |
| 5,359,183 A | 10/1994 | Skodlar | |
| 5,477,040 A | 12/1995 | Lalonde | |
| 5,569,897 A | 10/1996 | Masuda | |
| 5,621,201 A | 4/1997 | Langhans et al. | |
| 5,777,306 A | 7/1998 | Masuda | |
| 5,787,404 A | 7/1998 | Fernandez-Holmann | |
| 5,864,830 A | 1/1999 | Armetta et al. | |
| 5,883,452 A | 3/1999 | Masuda | |
| 5,914,472 A | 6/1999 | Foladare et al. | |
| 5,950,179 A | 9/1999 | Buchanan et al. | |

(Continued)

OTHER PUBLICATIONS

"Ambalink Launches Secure Online Shopping in the UK" Universal News Services Limited, Universal News Services, Jun. 8, 1999.

(Continued)

*Primary Examiner* — Lindsay M. Maguire
(74) *Attorney, Agent, or Firm* — Snell & Wilmer L.L.P.

(57) ABSTRACT

A method and apparatus are provided for a no pre-set spending limit transaction card with features and attributes of both a credit card and a charge card, including an overlimit spend feature and an associated communicated line of credit. The transaction card may carry a balance like a credit card and may require that a card user pay down the balance carried forward to the line of credit subsequent to the end of each billing cycle. When the user has reached or exceeded the communicated line of credit, each subsequent transaction request for a new transaction by the user is evaluated on a case-by-case basis by a process that includes execution an overlimit spend authorization logic or process.

7 Claims, 3 Drawing Sheets

U.S. PATENT DOCUMENTS

| | | | |
|---|---|---|---|
| 5,970,478 A | 10/1999 | Walker et al. | |
| 5,991,413 A | 11/1999 | Arditti et al. | |
| 6,000,832 A * | 12/1999 | Franklin et al. | 700/232 |
| 6,029,890 A | 2/2000 | Austin | |
| 6,052,675 A * | 4/2000 | Checchio | 705/44 |
| 6,108,642 A | 8/2000 | Findley | |
| 6,144,948 A | 11/2000 | Walker et al. | |
| 6,158,657 A | 12/2000 | Hall, III et al. | |
| 6,173,269 B1 | 1/2001 | Solokl et al. | |
| 6,208,978 B1 | 3/2001 | Walker et al. | |
| 6,324,524 B1 | 11/2001 | Lent et al. | |
| 6,339,766 B1 | 1/2002 | Gephart | |
| 6,343,279 B1 | 1/2002 | Bissonette et al. | |
| 6,529,725 B1 * | 3/2003 | Joao et al. | 455/406 |
| 6,681,988 B2 * | 1/2004 | Stack et al. | 235/380 |
| 2002/0063153 A1 * | 5/2002 | Stack et al. | 235/380 |
| 2004/0039694 A1 * | 2/2004 | Dunn et al. | 705/39 |
| 2004/0088257 A1 * | 5/2004 | Wong et al. | 705/41 |

OTHER PUBLICATIONS

International Search Report for PCT/US2003/034357 dated Apr. 21, 2004.

* cited by examiner

METHOD AND APPARATUS FOR A NO PRE-SET SPENDING LIMIT TRANSACTION CARD

FIELD OF THE INVENTION

The present invention relates generally to financial transaction processing systems of purchases made via a transaction card. More particularly, the present invention relates to a method and apparatus for processing user financial transactions made on a transaction card that combines features of a credit card and charge card for purchases of goods and/or services where the purchase amount equals or exceeds a user's communicated line of credit.

BACKGROUND OF THE INVENTION

The use of financial cards such as credit cards, charge cards, debits cards, and automated teller machine (ATM) cards is well known. These cards, which are used by consumers everyday, have many features and characteristics which offer flexibility to customers or users. For example, credit cards such as VISA®, MasterCard®, and Discover® credit cards typically offer revolving credit with a predetermined line of credit amount for each cardholder. Further, customers are able to carry a balance forward from billing cycle to billing cycle. The credit card customer will incur interest charges on the balance carried forward and must usually make a minimum payment. So long as a customer is carrying out transactions that together with their current credit card balance is less than their communicated line of credit, those transactions are typically approved. Once the customer's communicated line of credit is exceeded, a customer transaction on that credit card will typically be denied. The customer will generally have to make a payment to the credit card company sufficient to bring the credit card balance below the communicated line of credit or alternatively request a larger line of credit. The same issue will arise later if the line of credit is again exceeded.

Another type of financial card is a charge card such as cards issued by American Express. A charge card allows a customer to make purchases similar to a credit card. Unlike a credit card however, with a charge card, a customer is required to pay off the entire balance of the transactions or charges made on the charge card at the end of each billing cycle. Also, unlike a credit card, a charge card generally does not have a communicated line of credit associated with that card for that customer. A charge card with no preset or variable spending limit associated with the customer or charge card requires approval or authorization for each customer transaction on a transaction-by-transaction basis instead of on the basis of a fixed communicated line of credit amount. The customer spending limit is determined by authorization logic which evaluates the customer's credit at the time of the requested transaction and is typically based on a customer's spending and payment patterns, credit history, place of transaction, amount of transaction, and other parameters. The spending amounts authorized will vary from person to person depending on their particular financial characteristics including, among others, the user's payment and spending patterns and credit history. Further, different financial institutions generally have their own institution specific authorization or approval logic for their charge cards. However, the end result is typically the same, certain authorization logic is used to determine whether a transaction request will be approved or denied.

The different features of financial transaction cards often result in the need for card user to obtain multiple transaction cards to meet their financial needs. Multiple transaction cards can be cumbersome, bulky and hard to keep track of. Thus, there is a need for a novel transaction card that advantageously combines the various features and functions of existing financial cards to more efficiently and conveniently provide for and meet a customers financial needs.

SUMMARY OF THE INVENTION

The present invention provides a method and apparatus for a no pre-set spending limit transaction card with features and attributes of both a credit card and a charge card that can benefit both card users and card issuers. The novel method and apparatus uses a card with an overlimit spend feature and an associated communicated line of credit. The card user will be able to carry a balance like a credit card. And, when the user has reached or exceeded a communicated line of credit, each subsequent transaction request for a new transaction by the user is evaluated by the card issuer through an overlimit spend authorization logic or process on a transaction-by-transaction basis.

The method for carrying out a financial transaction using a transaction card comprises the steps of having a transaction card account corresponding to the transaction card with an associated line of credit and a transaction card balance of previously authorized transaction amounts in a current billing cycle, receiving an authorization request for a new transaction amount to be charged against the transaction card account for payment of goods or services, and determining an aggregate amount of the existing transaction card balance and the new transaction amount. The aggregate amount is then compared against the card's communicated line of credit, and when the aggregate amount is equal to or larger than the associated line of credit, overlimit spend authorization logic is executed to determine a response on whether the authorization request for the submitted transaction amount will approved or denied.

It is an object of the present invention to provide a method for providing an authorization response for a financial transaction request where a user has exceeded a communicated line of credit.

It is an object of the present invention to provide a method for providing an authorization response on a case-by-case basis for a financial transaction request by a user that has exceeded his/her communicated line of credit.

It is an object of the present invention to provide a method for providing an authorization response for a financial transaction where a user has presented a card where the card account balance has exceeded a communicated line of credit and where the card is a credit card, charge card, smart card, bank card, transaction card, access card, or an electronic commerce card.

The following drawings and description set forth additional advantages and benefits of the invention. More advantages and benefits will be obvious from the description and may be learned by practice of the invention.

BRIEF DESCRIPTION OF THE DRAWINGS

The present invention may be better understood when read in connection with the accompanying drawings, of which.

DETAILED DESCRIPTION

Figure 1:
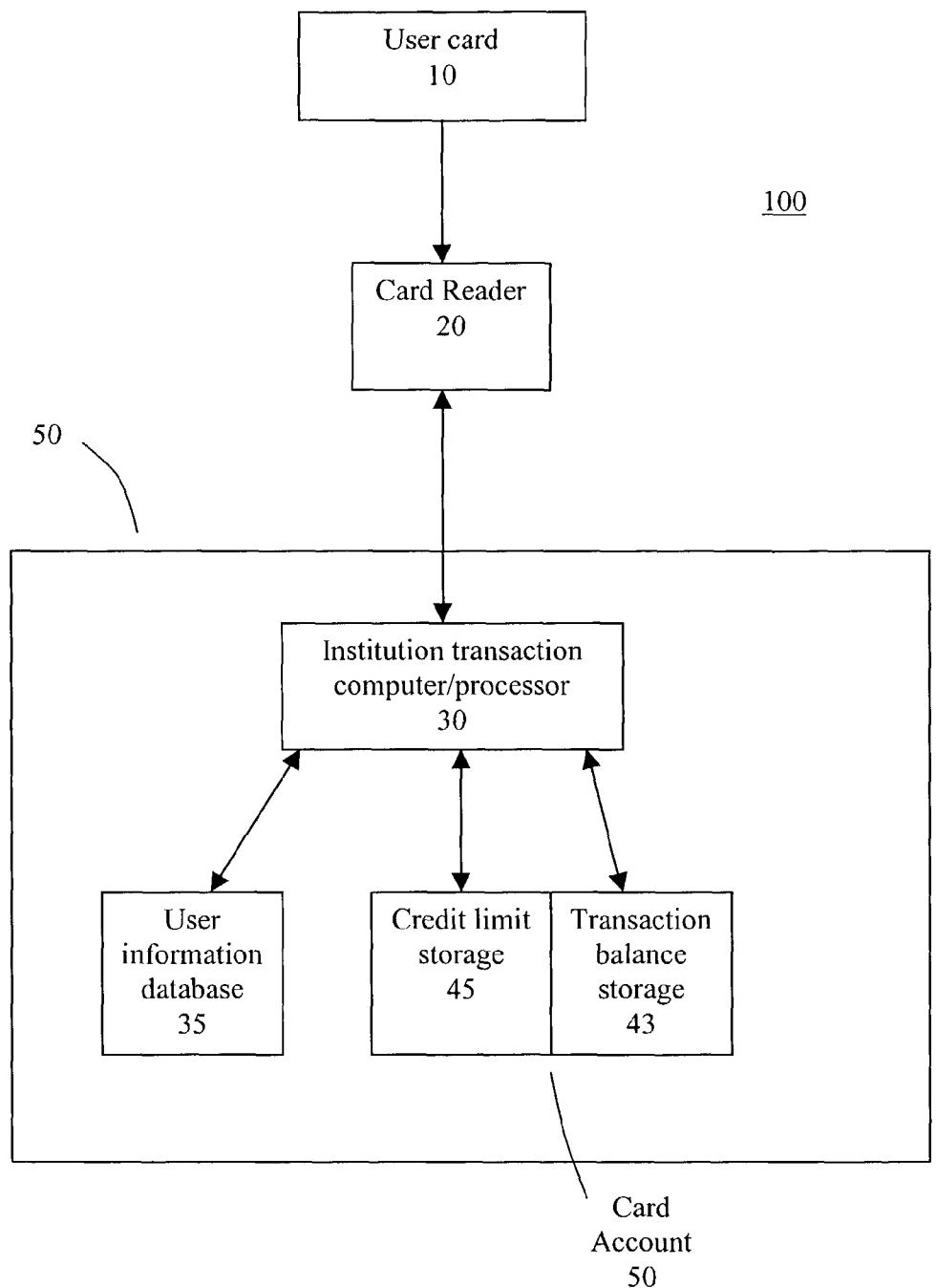
FIG. 1 depicts a block diagram generally showing an embodiment of a system for carrying out the no pre-set spending limit method in accordance with the present invention.

FIG. 1 illustrates an embodiment of a system 100 to carry out the no pre-set spending limit or variable spend limit method in accordance with the present invention. In the embodiment shown, the system 100 comprises a user transaction card 10, a transaction card reader 20, and a transaction computer or processor 30 with access to a customer information database 35 and transaction card account 40.

A customer or transaction card user deciding to make a purchase of goods and/or services will present his transaction card 10 to the merchant providing the desired goods and services. The card or transaction card 10 presented could be a new type of card that can be used in the novel method described herein or could be any one of existing cards that have been adapted to be used in the embodiment of the novel method discussed herein. For example, the card 10 could be a typical credit card, charge card, smart card, bank card, transaction card, access card, or a type of electronic commerce card. The merchant uses the card reader 20, or other device operable to read information from the transaction card 10. The card reader 20 reads information from the card 10 and communicates with an appropriate financial institution 50, e.g. a banking system or network associated with the institution 50 issuing the transaction card 10.

The card reader 20 is operatively coupled to the transaction computer or processor 30 of the financial institution 50. This may be done via a dedicated communication line or other means of two way communication between the card reader 20 and the transaction computer 30. The merchant's card reader 20 submits a transaction request for authorization or approval of the customer's desired purchase transaction. The transaction request submitted via the card reader 20 to the transaction computer or processor 30 may include, among other information, transaction card information, merchant identification, transaction amount, etc.

Those of skill in the art will readily recognize that although a card reader is shown as the device that communicates with the transaction processor, other devices may also be substituted. For example, a user may in some cases desire to retrieve cash from an automated teller machine (ATM). In that case, it would be the ATM machine that would communicate with the transaction processor 30. Other devices may be used that can operatively interact with the transaction processor 30, internet or web servers, interactive voice response units, graphical user interfaces, dual tone multi frequency generating devices, etc.

The financial institution 50 can comprise the transaction computer or processor 30, already mentioned, a transaction card account 40 associated with the particular transaction or user card 10, and a cardholder information database 35. The financial institution system 50 may also include a customer services component (not shown) that may operatively interact with a customer, merchant, or other institution 50 components, e.g., the transaction processor 30 or user information database 35, as necessary in a particular transaction request.

The transaction computer 30 may be operatively coupled to the merchant card reader 34, the user information database 35 and the transaction card account 40 associated with the transaction card 10. The transaction computer may manipulate and process information received or retrieved from these devices. The transaction computer 30 may be operatively coupled to the card reader 20 to received and respond to transaction request from a merchant. The transaction computer 30 may also be operatively coupled to the cardholder or customer information database 35 such that cardholder information, for example, customer address, credit history, spending patterns, payment patterns, or the like may be accessed and utilized as necessary to carryout authorization of merchant transaction requests.

Additionally, the transaction computer 30 may be operatively coupled to the transaction card account 40 in such a way that a transaction balance 43 corresponding to the transaction card account 40 may be accessed or updated as required. The transaction balance 43 is preferably an aggregate or sum of previously authorized transactions in a given billing cycle, e.g., in the present monthly billing cycle, for that transaction card 10 and any outstanding balance, e.g. purchases, finance charges, fees, etc. carried forward from previous cycles. The transaction computer 30 also has access to information relating to a communicated line of credit (LOC) amount 45 associated with a particular transaction card 10. The communicated line of credit is typically a fixed quantity and can be accessed by the transaction processor 30 in response to a transaction request. However, the communicated line of credit may be a quantity that is updated from time to time by the computer processor 30 as dictated by an institution's 50 guidelines.

In operation, a preferred embodiment of the transaction card 10 combines features of a charge card and a credit card in novel ways. In this embodiment, the transaction card 10 has an associated communicated line of credit similar to a credit card and a no pre-set spending limit similar to a charge card. The communicated line of credit associated with the transaction card 10 allows a customer to carry a transaction card balance over time in an amount up to the communicated line of credit. Interest will be assessed on the customer's balance carried forward on a billing cycle basis, e.g., a monthly basis. The billing cycle can vary depending on the institution 50 and can be one month, 25 days or some other time period chosen by the institution. Once the line of credit limit associated with the transaction card 10 is reached or exceeded, each approval request for a new transaction above the communicated line of credit is preferably evaluated by the card issuer or institution issuer 50 on a transaction-by-transaction, or case-by-case, basis by a process that executes an overlimit spend authorization logic or process (Shown in FIGS. 2A and 2B). The authorization process logic or process, executed by the logic transaction processor 30, evaluates the user's or customer's credit worthiness at the time of the requested transaction. The user's or customer's credit worthiness is based on various factors or parameters including, among others, current card balance, payment and spending patterns, credit history and ratings, customer's standing, etc. Those of skill in the art will readily appreciate that variable spend authorization logic or no pre-set spending limit algorithms are widely used and well known in the financial transaction card industry for responding to authorization of transaction requests. Different institutions 50 may have institution specific no pre-set spending limit authorization logic or algorithms that take into account a variety of customer parameters and assign varying importance to those parameters in making a determination of whether or not to authorize a submitted transaction request.

In an alternate embodiment, the user or customer may be required to pay down the revolving credit balance associated with the transaction card 10 down to the communicated line of credit limit before the Payment Due Date in order for new transaction amounts equaling or exceeding the communicated line of credit to be considered by the transaction processor for authorization (e.g., account in good standing). The transaction processor 30 can access the user information database 35 and/or the customer card account 40 to determine whether the user or customer has been paying the transaction card balance down each billing cycle.

Figure 2A:
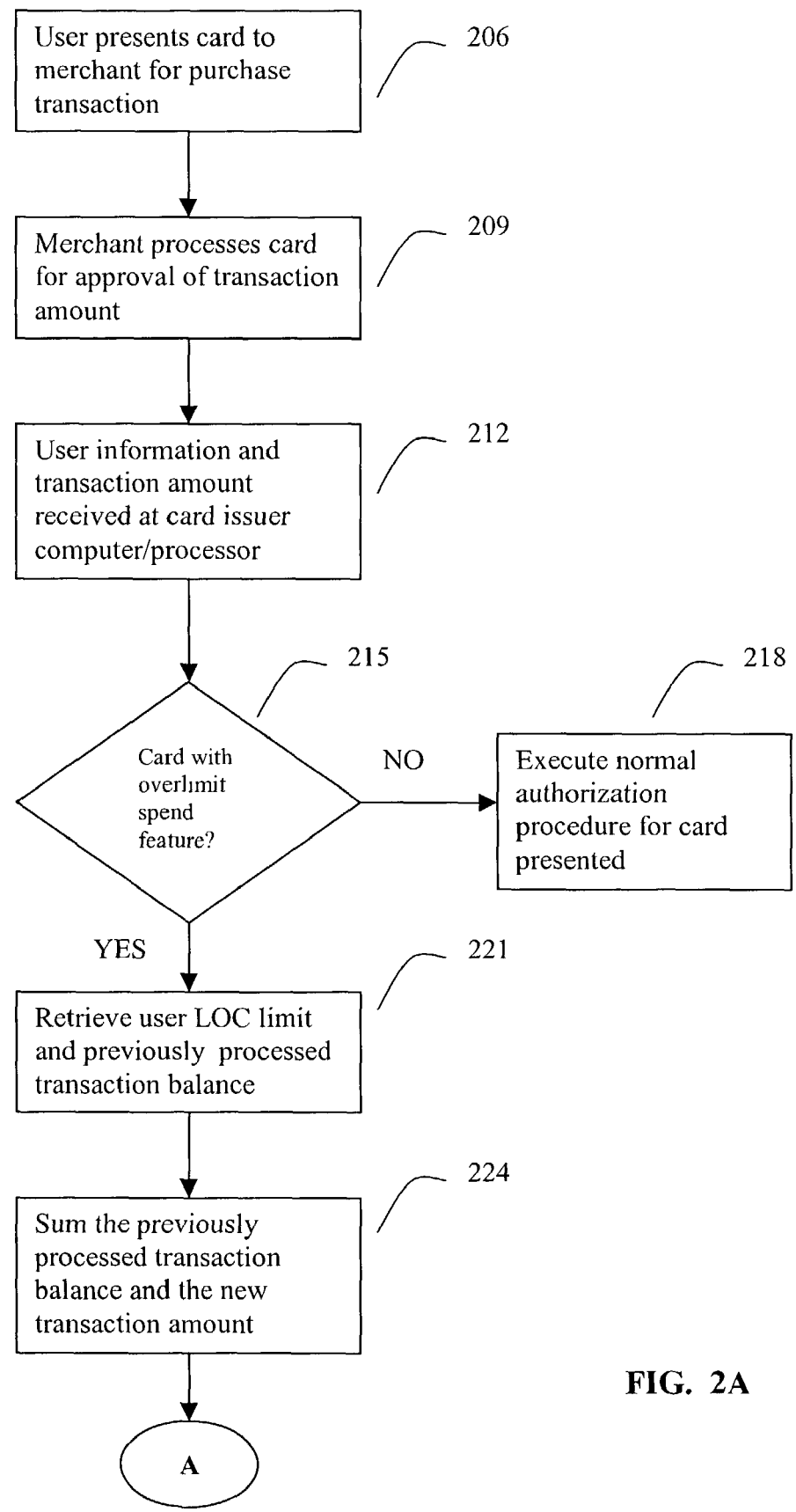
FIGS. 2a and 2b depict an embodiment of the steps to carryout the no pre-set spending limit method in accordance with the present invention.
Figure 2B:
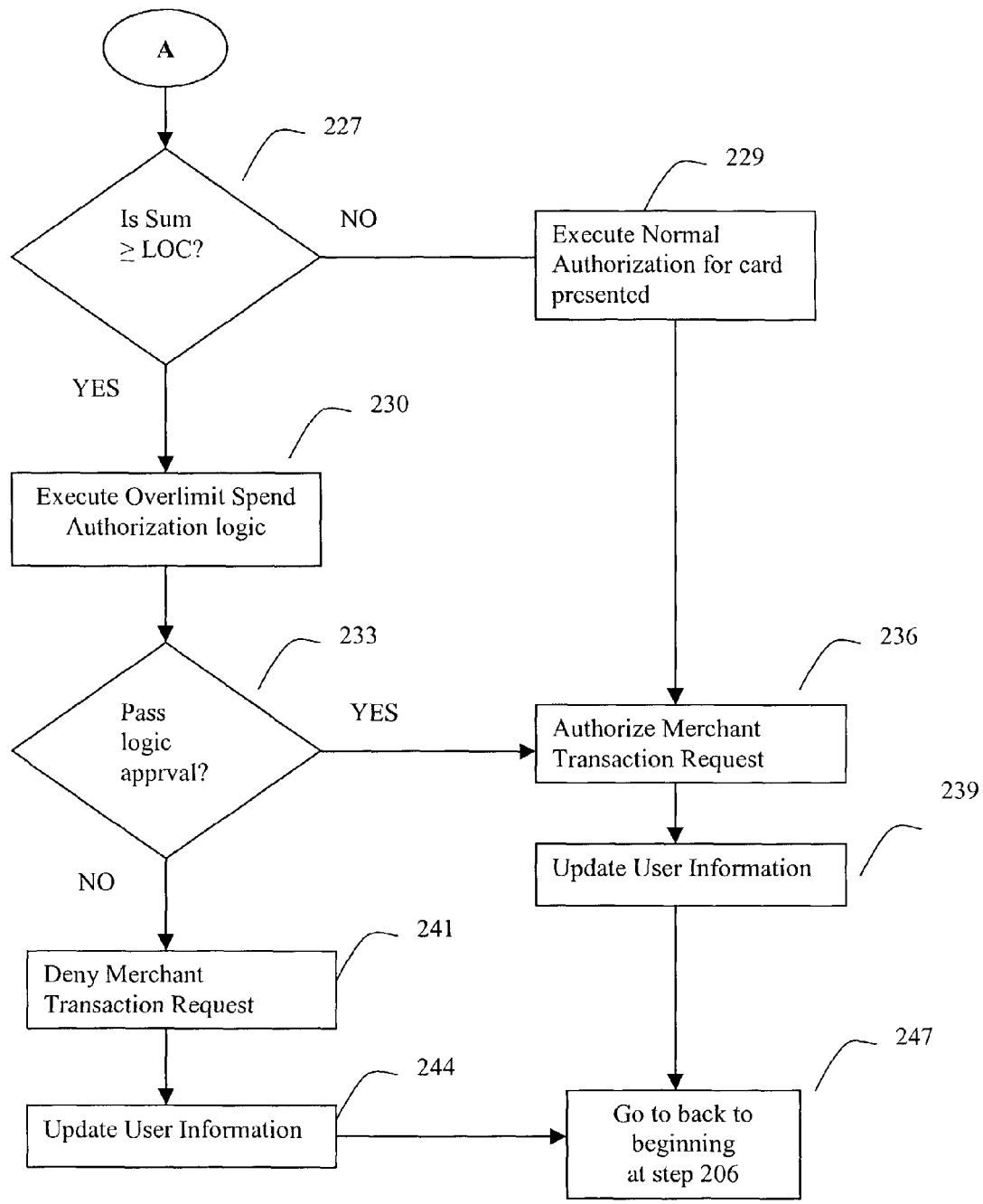

Referring now to FIGS. 2a and 2b, a preferred embodiment is shown of the steps to carryout the no pre-set spending limit method 200 in accordance with the present invention. In steps 206 and 209, the cardholder or user presents the transaction card 10 to the merchant for the purchase of goods or services. The merchant then uses the card reader 20 to read the user account information on the user card 10 and to access the transaction computer 30 to obtain authorization or approval to carry out the point-of-sale transaction for the goods or services desired by the cardholder.

In step 212, the transaction computer 30, in communication with the card reader 20, receives the transaction card 10 information and a request for authorization or approval of a transaction amount for the service or goods desired.

In step 215, the transaction computer first makes a determination as to whether the card or transaction card presented has an "overlimit spend feature." In step 218, if the transaction card 10 does not have the "overlimit spend feature", then the transaction processor 30 carries out default authorization procedures specific for the credit card, charge card, or other presented card for approval or denial of the transaction amount.

In step 221, the transaction computer 30 has determined that the transaction card 10 does have the "overlimit spend feature" and will access the appropriate cardholder account 40 and user information database 35 as needed. In particular, the transaction computer 30 will access the communicated line of credit amount and the transaction balance of previously approved transactions associated with the transaction card 10 received.

In step 224, the transaction computer 30 will aggregate or sum the transaction balance of previously approved transactions with the current or new transaction amount requested by the merchant.

In step 227, the transaction computer 30 will compare this aggregated figure to the communicated line of credit amount to determine whether the aggregated figure is equal to or larger than the communicated line of credit and whether the card account is in good standing.

In step 229, if the aggregated figure is not equal to or larger than the communicated line of credit and the account is in good standing, the transaction computer 30 will execute normal authorization procedures for the card presented, whether a credit card, charge card or other transaction card. In step 236, the transaction computer 30 will then notify the merchant that the merchant's transaction request has been authorized. In step 239, the transaction computer 30 will update the cardholder's information, i.e., update the user information database 35 and the transaction balance 43, to reflect the approved transaction based on the aggregate figure being less than the communicated line of credit. The process 200 then proceeds back to step 206 in preparation for the next customer transaction.

Alternatively, in step 230, if the aggregated figure is equal to or larger than the communicated line of credit, then the transaction computer 30 will execute or carry out an overlimit spend authorization logic or algorithm to determine whether the merchant's transaction amount may nevertheless be approved. The approval or denial of the merchant's transaction amount is based on parameters related to the cardholder and authorization logic or algorithm that is specific to the card issuer 50. For example, an institution 50 may use the cardholders credit history, past payment and spending patterns, amount of requested transaction, standing of member with the institution, risk level of transaction, etc., in their particular overlimit spend authorization logic or algorithm.

In step 233, the results of the authorization logic carried out by the transaction processor 30 are checked to determine whether the transaction has been approved or denied. If the transaction is approved based on the overlimit authorization logic, the merchant will be notified that the requested transaction request will be approved in Step 236. In step 239, the transaction computer 30 will then update the cardholder's information, i.e., update the user information database 35 and the transaction balance 43 to reflect the approved transaction amount based on the successful result or outcome of the overlimit authorization logic. The process 200 then proceeds back to step 206 in preparation for the next customer transaction.

Alternatively, in step 233, if the transaction is denied based on the overlimit authorization logic or algorithm, the merchant will be notified that the requested transaction request will be denied in Step 241. In step 244, the transaction computer 30 will update the cardholder's information, i.e., update the user information database 35 and the transaction balance 43 to reflect the denied transaction amount based on the negative result of the overlimit authorization logic. The process 200 then proceeds back to step 206 in preparation for the next customer transaction.

The invention has been described and illustrated with respect to certain preferred embodiments by way of example only. Those skilled in that art will readily recognize that the preferred embodiments may be altered or amended without departing from the true spirit and scope of the invention. Therefore, the invention is not limited to the specific details, representative devices, and illustrated examples in this description. The present invention is limited only by the following claims and equivalents.

We claim:

1. A method, comprising:

receiving, by a computer based system for managing a transaction account, an authorization request for a transaction, wherein the authorization request includes a transaction amount, and a merchant identifier, and wherein the transaction includes a transaction account comprising a predetermined credit limit;

determining, by the computer based system, an existing balance of the transaction account;

comparing; by the computer based system, the existing balance and the predetermined credit limit;

calculating, by the computer based system, an available credit amount;

comparing, by the computer based system, the transaction amount to the available credit amount, wherein the available credit amount is at least one of greater than the transaction amount, equal to the transaction amount, and less than the transaction amount;

determining, by the computer based system, that the transaction account has an overlimit spending feature in response to the available credit amount being less that the transaction amount;

requesting, by the computer based system, at least one of payment history for the transaction account, and spending patterns associated with the transaction account, in response to the transaction account having the overlimit spending feature;

requesting, by the computer based system, a credit history of an owner of the transaction account, in response to the transaction account having the overlimit spending feature;

analyzing, by the computer based system, the credit history, the authorization request, and at least one of the payment history for the transaction account, and the spending patterns associated with the transaction account, in response to the available credit amount being less than the transaction amount and the transaction account having the overlimit spending feature;

analyzing, by the computer based system, a profile to determine a number of previously authorized over-limit transactions:

determining, by the computer based system, a response to the authorization request based on the analyzing of the credit history, the analyzing of the profile, the authorization request, and at least one of: the payment history for the transaction account and the spending patterns associated with the transaction account, and wherein the response is at least one of an authorization and a denial;

transmitting, by the computer based system, the response to the merchant; and updating, by the computer based system, the profile associated with the transaction account with at least one of the authorization and the denial.

2. The method of claim 1, wherein the authorization request is transmitted to the computer based system at a point of sale terminal and at least one of the authorization and denial is sent by the computer based system to the point of sale terminal, prior to the transaction being completed.

3. The method of claim 2, wherein the transaction account is associated with at least one of a credit card, charge card, smart card, bank card, transaction card, access card and an electronic commerce card.

4. The method of claim 3, further comprising adding, by the computer based system, the transaction amount to the existing balance to create a current balance, in response the authorization.

5. The method of claim 4, further comprising verifying, by the computer based system, that the current balance was paid down to the predetermined credit limit, prior to termination of a previous billing cycle.

6. A tangible, non-transitory computer-readable storage medium having computer-executable instructions stored thereon that, if executed by a computer based system for managing a transaction account, cause the computer based system to perform a method comprising:

receiving, by the computer based system, an authorization request for a transaction, wherein the authorization request includes a transaction amount, and a merchant identifier, and wherein the transaction includes a transaction account comprising a predetermined credit limit;

determining, by the computer based system, an existing balance of the transaction account;

comparing, by the computer based system, the existing balance and the predetermined credit limit;

calculating, by the computer based system, an available credit amount;

comparing, by the computer based system, the transaction amount to the available credit amount, wherein the available credit amount is at least one of greater than the transaction amount, equal to the transaction amount, and less than the transaction amount;

determining, by the computer based system, that the transaction account has an overlimit spending feature in response to the available credit amount being less that the transaction amount;

requesting, by the computer based system, at least one of payment history for the transaction account, and spending patterns associated with the transaction account in response to the transaction account having the overlimit spending feature;

requesting, by the computer based system, a credit history of an owner of the transaction account in response to the transaction account having the overlimit spending feature;

analyzing, by the computer based system, the credit history, the authorization request, and at least one of the payment history for the transaction account, and the spending patterns associated with the transaction account, in response to the available credit amount being less than the transaction amount and the transaction account having the overlimit spending feature;

analyzing, by the computer based system, a profile to determine a number of previously authorized over-limit transactions;

determining, by the computer based system, a response to the authorization request based on the analyzing of the credit history, the analyzing of the profile, the authorization request, and at least one of: the payment history for the transaction account and the spending patterns associated with the transaction account, and wherein the response is at least one of an authorization and a denial;

transmitting, by the computer based system, the response to the merchant; and updating, by the computer based system, the profile associated with the transaction account with at least one of the authorization and the denial.

7. A computer based system for managing a transaction account, comprising:

a tangible, non-transitory memory communicating with a processor, the tangible, non-transitory memory having instructions stored thereon that, in response to execution by the processor, cause the processor to perform operations comprising:

receiving, by the processor, an authorization request for a transaction, wherein the authorization request includes a transaction amount, and a merchant identifier, and wherein the transaction includes a transaction account comprising a predetermined credit limit;

determining, by the processor, an existing balance of the transaction account;

comparing, by the processor, the existing balance and the predetermined credit limit;

calculating, by the processor, an available credit amount;

comparing, by the processor, the transaction amount to the available credit amount, wherein the available credit amount is at least one of greater than the transaction amount, equal to the transaction amount, and less than the transaction amount;

determining, by the processor, that the transaction account has an overlimit spending feature in response to the available credit amount being less that the transaction amount;

requesting, by the processor, at least one of payment history for the transaction account, and spending patterns associated with the transaction account in response to the transaction account having the overlimit spending feature;

requesting, by the processor, a credit history of an owner of the transaction account in response to the transaction account having the overlimit spending feature;

analyzing, by the processor, the credit history, the authorization request, and at least one of the payment history for the transaction account, and the spending patterns associated with the transaction account, in response to the available credit amount being less than the transaction amount and the transaction account having the overlimit spending feature;

analyzing, by the processor, a profile to determine a number of previously authorized over-limit transactions;

determining, by the computer based system, a response to the authorization request based on the analyzing of the credit history, the analyzing of the profile, the authorization request, and at least one of: the payment history for the transaction account and the spending patterns associated with the transaction account, and wherein the response is at least one of an authorization and a denial;

transmitting, by the processor, the response to the merchant; and updating, by the processor, the profile associated with the transaction account with at least one of the authorization and the denial.

* * * * *